United States Patent [19]
Kim

[11] Patent Number: 6,019,522
[45] Date of Patent: Feb. 1, 2000

[54] OPTICAL PART PACKAGING METHOD AND COLLIMATOR ASSEMBLY METHOD

[75] Inventor: Yeong-Ju Kim, Kumi-shi, Rep. of Korea

[73] Assignee: SamSung Electronics Co., Ltd., Kyungki-do, Rep. of Korea

[21] Appl. No.: 09/028,357

[22] Filed: Feb. 24, 1998

[30] Foreign Application Priority Data

Feb. 24, 1997 [KR] Rep. of Korea ......................... 97-5510

[51] Int. Cl.[7] .................................................. G02B 6/36
[52] U.S. Cl. ................................ 385/80; 385/31; 385/33; 385/38; 385/52; 385/51; 385/77; 385/78; 385/84
[58] Field of Search .................................. 385/31, 33, 38, 385/51, 52, 53, 76, 77, 78, 80, 84, 139

[56] References Cited

U.S. PATENT DOCUMENTS

| | | | |
|---|---|---|---|
| 4,258,977 | 3/1981 | Lukas et al. ........................... | 385/53 X |
| 4,406,515 | 9/1983 | Roberts ................................ | 385/53 X |
| 4,992,688 | 2/1991 | Cap et al. ................................ | 310/71 |
| 5,097,524 | 3/1992 | Wasserman et al. ................. | 385/33 X |
| 5,212,745 | 5/1993 | Miller ...................................... | 385/25 |
| 5,418,876 | 5/1995 | Lee .......................................... | 385/80 |

FOREIGN PATENT DOCUMENTS 0 766 505 A2   4/1997   European Pat. Off. ........... 385/147 X

OTHER PUBLICATIONS

*Technical Data Sheet;* Ablebond 8380 "Snap Cure, Electronically Conductive Die Attach Adhensive" Ablestik. May 1992.
EP 0776 038 A (Johnson Terence Leslie; Varintelligent BVI LTD. (VG) May 28, 1997, claims 1–10; Figure 1.

*Primary Examiner*—Brian Healy
*Attorney, Agent, or Firm*—Robert E. Bushnell, Esq.

[57] ABSTRACT

An optical part packaging method and a collimator assembly method are provided. In the method for packaging an optical part having collimators which convert light emitted from a fine light source to a parallel light, and focus the transmitted parallel light, optical devices are bonded in the collimators by a conductive adhesive to increase the adhesiveness between the optical devices and the tensile strength of the optical devices. Then, the collimators are aligned in both sides of the optical part, a first housing, integrally formed, is bonded around the collimators by soldering to protect the optical devices and bond the collimators, and a second housing is bonded around the first housing by a waterproof and vibroisolating material to increase the mechanical strength of the first housing. Finally, protection tubes are bonded to the respective collimators by epoxy sealing to protect the ends of optical fibers in the collimators.

19 Claims, 7 Drawing Sheets

OPTICAL PART PACKAGING METHOD AND COLLIMATOR ASSEMBLY METHOD

CLAIM OF PRIORITY

This application makes reference to, incorporates the same herein, and claims all benefits accruing under 35 U.S.C §119 from an application entitled Optical Part Packaging Method And Collimator Assembly Method earlier filed in the Korean Industrial Property Office on Feb. 24, 1997, and there duly assigned Ser. No. 97-5510 by that Office.

BACKGROUND OF THE INVENTION

1. Field of the Invention

The present invention relates to a method for packaging an optical part such as an optical isolator, a wavelength multiplexer, an optical coupler, and a collimator, and in particular, to an optical part packaging method which can improve characteristics of an optical part in temperature and tensile strength.

2. Description of the Related Art

Reliability of optical fiber parts, fine optical parts, and optical waveguide parts generally depends on their packaging reliability. Packaging refers to fixing an optical fiber, and metal or plastic housings for protecting optical components, implemented in two stages: fixing a first housing after arranging the components, for a specific function; and fixing a second housing for attaching an external label of a fabricated optical part thereon and increasing the reliability of the optical part. The are numerous means and methods for fixing optical fibers end-to-end and a few of these are depicted by U.S. Pat. No. 5,097,524 to Alexander Wasserman et al. entitle Optical Fiber Termination, U.S. Pat. No. 5,418,876 to Hsin Lee entitled Fiber Optic Connector With Epoxy Preform; U.S. Pat. No. 5,212,745 to Calvin M. Miller entitled Fixed And Temperature Tuned Fiber Fabry-Perot Filters, U.S. Pat. No. 4,406,515 to Harold A Roberts entitled Fiber Optic Connector, and U.S. Pat. No. 4,258,977 to Helmut H. Lukas entitled Optical Fibre Connector.

Here, a collimator assembly method and a collimator-including optical part packaging method will be described.

The collimator is an optical system for converting light emitted from a fine light source to a parallel light or converging transmitted parallel light, using variations on the wave front of light caused by a lens. A collimator has an optical fiber tube for retaining an optical fiber, a ferrule for supporting the optical fiber tube and the optical fiber, a lens for focusing light emitted from the optical fiber, and a sleeve for fixedly aligning the lens with the ferrule.

In a conventional collimator assembly method, the coating of the optical fiber tube is peeled off to expose the optical fiber retained therein. Then, the optical fiber tube and the optical fiber are coated with an adhesive on the surfaces thereof, and fixedly inserted into the center of the ferrule. Then, the ferrule is coated with the adhesive on a surface portion thereof, and fixedly inserted in the sleeve. The lens is aligned with the ferrule, coated with the adhesive on diametrically opposite ends thereof, and fixedly inserted into the sleeve.

Then, a pair of collimators are aligned in a package housing, wherein a first housing is fixed around both collimators by a plurality of solder joints to fix the collimators and protect the optical devices thereof. That is, the first housing is fixed around the sleeves by the solder joints. Then, a second housing is fixed around the first housing by the adhesive, for attaching an external label thereon and increasing the mechanical strength of the first housing. Protection tubes are fixed to the collimators by an epoxy sealing to protect the ends of the optical fibers from an external environment, with the brims of the protection tubes connected to both brims of the second housing. Thus, the collimators are completely packaged.

However, the above conventional optical part (collimator) packaging method has distinct problems. The reliability of the optical part is lowered due to temperature changes, vibration, shock, and tensile force, in a long term, because the optical components are fixed in the collimators by a fixing material (adhesive or solder), and the collimators are packaged. Further, the sleeves are fixed to the first housing by soldering, and the temperature of the first housing exceeds at least 100° during soldering, thus varying characteristics of the fixing material (adhesive or solder) and remarkably decreasing the reliability of the optical parts. In addition, vibration and moisture are easily introduced into the collimators because the first and second housings are fixed by the fixing material. As a result, the optical devices are highly vulnerable to breakage, and their optical characteristics are degraded.

SUMMARY OF THE INVENTION

A first object of the present invention is to provide an optical part packaging method which can increase the temperature reliability and tensile strength of an optical part by use of a conductive adhesive for packaging.

A second object of the present invention is to provide a collimator assembly method for enhancing the optical characteristics of a collimator by fixing optical devices of the collimator with a conductive adhesive.

A third object of the present invention is to provide a collimator assembly method which can improve characteristics of a collimator in temperature cycle and tensile strength by use of a conductive adhesive.

A fourth object of the present invention is to provide an optical part packaging method and a collimator assembly method, which can facilitate fabrication processes and increase productivity by use of a conductive adhesive in fixing a first housing to a collimator.

A fifth object of the present invention is to provide an optical part packaging method and a collimator assembly method for enabling an optical part to be vibroisolated and waterproof.

To achieve the above objects, there is provided a method for packaging an optical part having collimators which convert light emitted from a fine light source to a parallel light, and focus the transmitted parallel light. In the optical part packaging method, optical devices are fixed in the collimators by a conductive adhesive to increase the adhesiveness between the optical devices and the tensile strength of the optical devices. Then, the collimators are aligned in both sides of the optical part, a first housing, integrally formed, is fixed around the collimators by soldering to protect the optical devices and fix the collimators, and a second housing is fixed around the first housing by a waterproof and vibroisolating material to increase the mechanical strength of the first housing. Finally, protection tubes are fixed to the respective collimators by epoxy sealing to protect the ends of optical fibers in the collimators.

According to another aspect of the present invention, there is provided a method for packaging an optical part having collimators which convert light emitted from a fine light source to a parallel light, and focus the transmitted parallel light. In the optical part packaging method, optical devices are fixed in the collimators by a conductive adhesive to increase the adhesiveness between the optical devices and the tensile strength of the optical devices. Then, the collimators are aligned in both sides of the optical part, individual first housings are fixed around the respective collimators by soldering to protect the optical devices and fix the collimators, and the ends of the individual first housings are connected by soldering. Finally, a second housing is fixed around the first housings by a waterproof and vibroisolating material to increase the mechanical strength of the first housings, and protection tubes are fixed to the respective collimators by epoxy sealing to protect the ends of optical fibers in the collimators.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
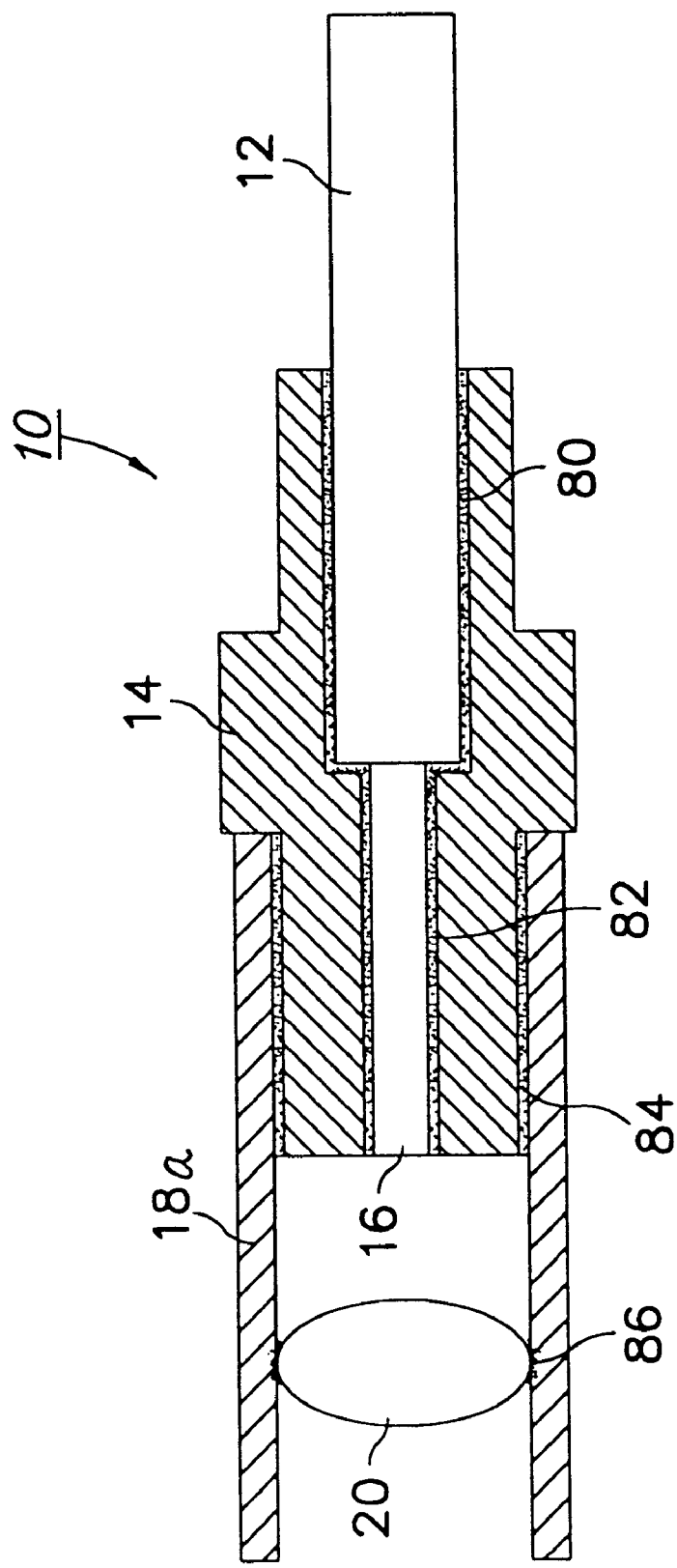
FIG. 1 is a schematic view of a conventional collimator having optical devices fixed by a fixing material.

Preferred embodiments of the present invention will be described in detail referring to the attached drawings. Like reference numerals denote the same components in the drawings, and a detailed description of known function and structure of the present invention will be avoided when it is deemed to obscure the subject matter of the present invention.

As shown in FIG. 1, a collimator 10 has an optical fiber tube 12 for retaining an optical fiber 16, a ferrule 14 for supporting optical fiber tube 12 and optical fiber 16, a lens 20 for focusing light emitted from optical fiber 16, and a sleeve 18a for fixedly aligning lens 20 with ferrule 14.

In a conventional collimator assembly method, the coating of optical fiber tube 12 is peeled off to expose optical fiber 16 retained therein. Then, optical fiber tube 12 and optical fiber 16 are coated with an adhesive, that is, a fixing material 80 and 82 on the surfaces thereof, and fixedly inserted into the center of ferrule 14. Then, ferrule 14 is coated with the fixing material 84 on a surface of a portion thereof, and fixedly inserted in sleeve 18a. Lens 20 is aligned with ferrule 14, coated with the fixing material 86 on diametrically opposite ends (top and bottom ends as oriented in the drawing) thereof, and fixedly inserted into sleeve 18a.

Figure 2:
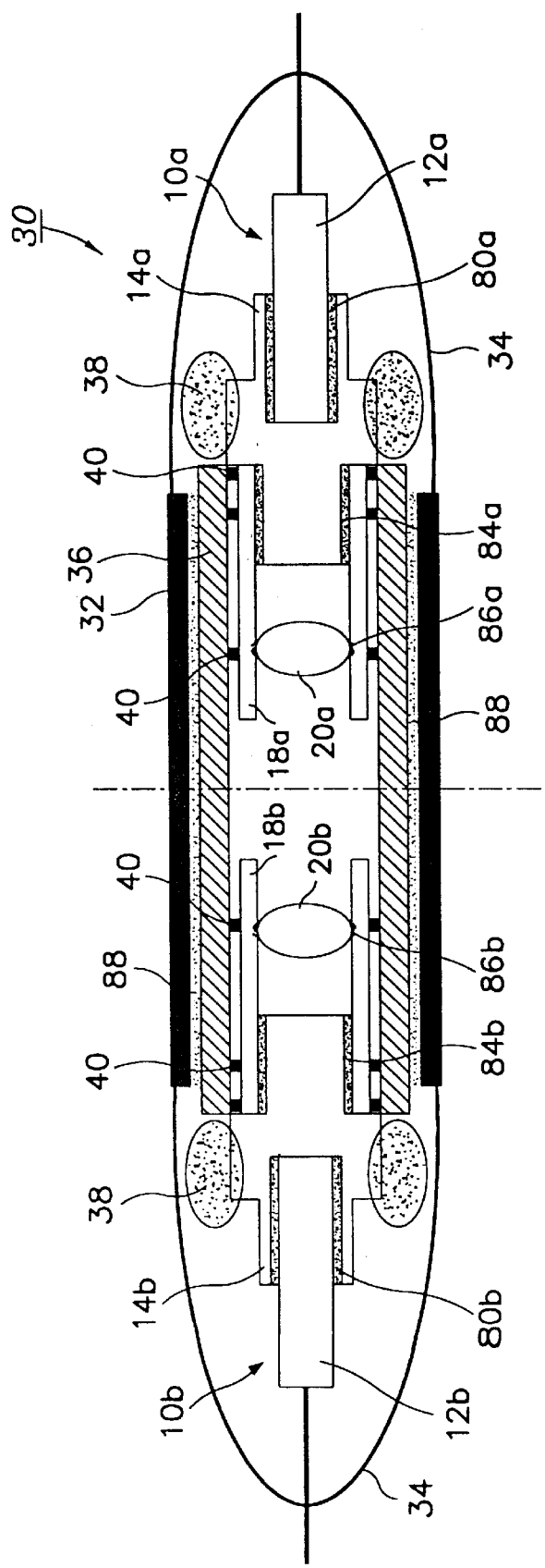
FIG. 2 is a schematic view of a conventional optical part packaged by a fixing material and soldering.

FIG. 2 is a schematic view of an optical part including collimators, packaged for a specific function according to a conventional method. As shown in FIG. 2, optical devices are fixed in respective collimators 10a and 10b by the fixing material, as in FIG. 1. Then, collimators 10a and 10b are aligned in both sides of an optical part 30, and a first housing 36, integrally formed, is fixed around collimators 10a and 10b by a plurality of solder joints 40 to fix collimators 10a and 10b and protect the optical devices thereof. That is, first housing 36 is fixed around sleeves 18a and 18b by solder joints 40. Then, a second housing 32 is fixed around first housing 36 by fixing material 88, for attaching an external label thereon and increasing the mechanical strength of first housing 36. Protection tubes 34 are fixed to collimators 10a and 10b by a sealing epoxy to protect the ends of optical fibers 16 from an external environment, with the brims of protection tubes 34 connected to both brims of second housing 32. Thus, optical part 30 is completely packaged.

Figure 3:
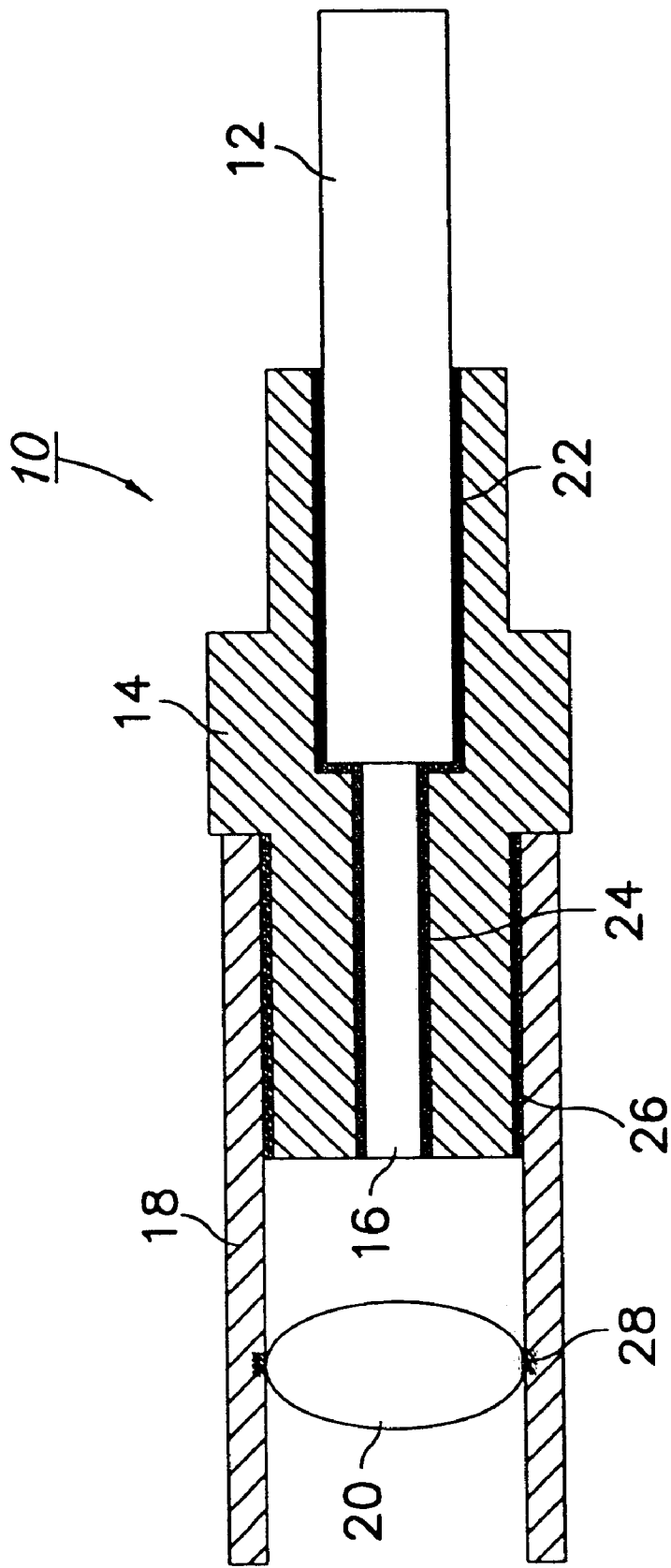
FIG. 3 is a schematic view of a collimator having optical devices fixed by a conductive adhesive according to a first embodiment of the present invention.

FIG. 3 is a schematic view of a collimator having optical devices fixed therein by a conductive adhesive according to a first embodiment of the present invention. As shown in FIG. 3, the optical devices in the collimator are fixed by the conductive adhesive to improve their characteristics in temperature, vibration, and temperature cycle. For assembly of collimator 10, optical fiber 16 is coated with metal optical fiber tube 12 to increase the adhesiveness of the conductive adhesive. Then, optical fiber tube 12 is partially peeled off to expose optical fiber 16. Optical fiber tube 12 and optical fiber 16 are coated with a thermal or electrical conductive adhesive 22 and 24 on the surfaces thereof, and fixedly inserted into the center of ferrule 14. Then, ferrule 14 having optical fiber 16 fixed therein is coated by a conductive adhesive 26 on a surface of a portion thereof, and fixedly inserted into sleeve 18. Lens 20 is aligned with the ferrule 14, coated with a conductive adhesive 28 on diametrically opposite ends thereof (the upper and lower ends thereof as oriented in the drawing), and fixedly inserted into sleeve 18. Here, conductive adhesives 26 and 28 are formed of a thermal or electrical conductive material to increase the temperature cycle characteristics of collimator 10.

Figure 4:
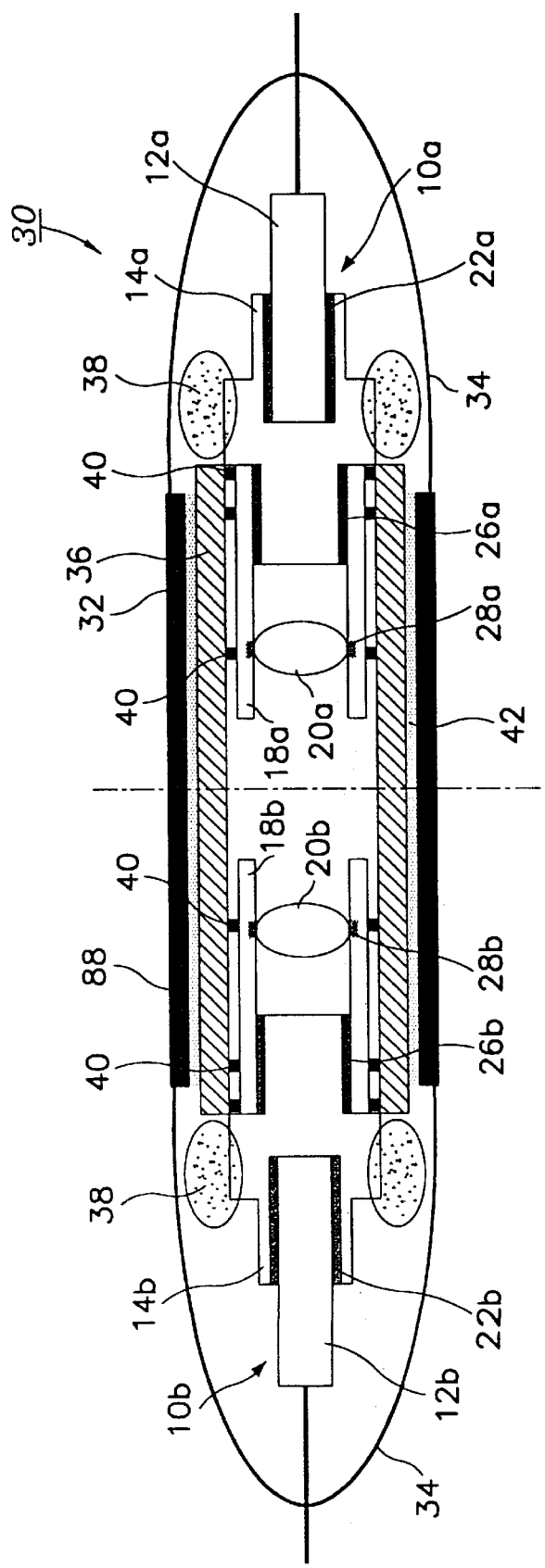
FIG. 4 is a schematic view of an optical part packaged by a waterproof silicon resin and soldering according to a second embodiment of the present invention.

FIG. 4 is a schematic view of an optical part including collimators, packaged for a specific function according to a second embodiment of the present invention. As shown in FIG. 4, optical devices are fixed in respective collimators 10a and 10b by a thermal or electrical conductive adhesive as in FIG. 3. Here, optical fibers (not shown) provided in collimators 10a and 10b are coated with metal optical fiber tubes 12a and 12b. Then, collimators 10a and 10b are aligned in both sides of optical part 30. Integrally formed first housing 36 is fixed around sleeves 18a and 18b by a plurality of solder joints 40 in order to fix collimators 10a and 10b, and protect the optical devices (i.e., lens 20, optical fiber 16, and ferrule 14) thereof from an external environment. That is, to facilitate packaging and increase reliability of optical part 30, first housing 36 is fixed to left and right portions of collimators 10a and 10b by soldering at 170–190° C., and to a center portion of collimators 10a and 10b by soldering at 120–150° C.

Then, second housing 32 is fixed around first housing 36 by a waterproof rubber or silicon 42 showing excellent waterproof and vibroisolating effects in order to increase the mechanical strength of first housing 36 and attach an external label thereon. Protection tubes 34 are fixed to collimators 10a and 10b by sealing epoxy 38 with the brims of protection tubes 34 connected to both brims of second housing 32, for protecting the ends of the optical fibers in collimators 10a and 10b. Thus, optical part 30 is completely packaged. Here, the thus-packaged optical part 30 shows an insertion loss deviation of 0.1 dB or lower with respect to a temperature cycle. Regarding the connection between the brims of protection tubes 34 and the brims of second housing 32, protection tubes 34 are fixed to a supporting material (not shown), such as a metal cap, and this supporting material is bonded to the brims of second housing 32 by an adhesive (not shown).

Figure 5:
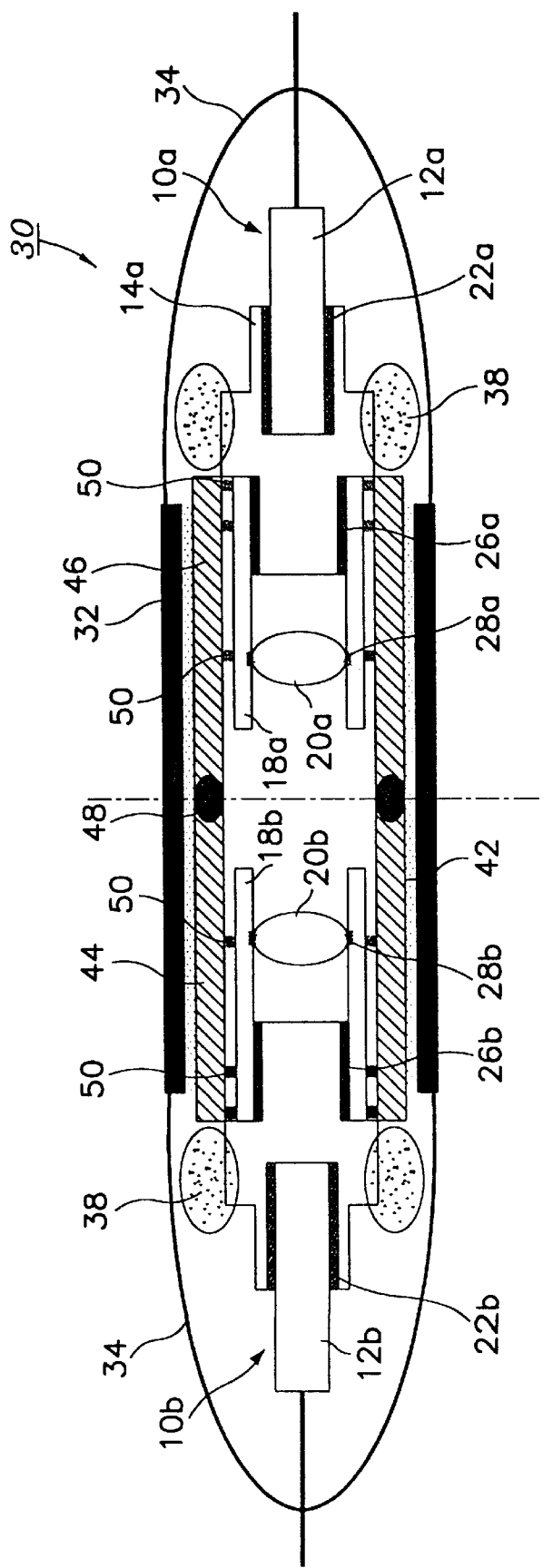
FIG. 5 is a schematic view of an optical part packaged by a conductive adhesive and a silicon resin according to a third embodiment of the present invention.

FIG. 5 is a schematic view of an optical part including collimators, packaged according to a third embodiment of the present invention, for implementing a specific function, contributing to automated fabrication of optical parts, and facilitating a fabrication process. As shown in FIG. 5, optical devices are fixed in respective collimators 10a and 10b by thermal or electrical conductive adhesive as in FIG. 3. Here, optical fibers provided in collimators 10a and 10b are coated with metal optical fiber tubes 12a and 12b. Then, collimators 10a and 10b are aligned in both sides of optical part 30. First and second housings 44 and 46 are fixed around sleeves 18a and 18b, respectively, by a conductive adhesive 50 in order to fix collimators 10a and 10b, protect the optical devices (i.e., the lens 20, the optical fiber 16, and the ferrule 14) thereof from an external environment, contribute to automated fabrication of an optical part, and facilitate the fabrication process. Here, conductive adhesive 50 is formed of a thermal or electrical conductive material to improve temperature cycle characteristics of optical part 30. Then, the right brim (as oriented in the drawing) of first housing 44 is connected to the left brim (as oriented in the drawing) of second housing 46 by solder joints 48 formed by a non-contact light source such as a high-power laser diode or a xenon lamp.

Then, a third housing 32 is integrally fixed around the connected first and second housings 44 and 46 by waterproof rubber or silicon 42 showing excellent waterproofing and vibroisolating effects in order to increase the mechanical strength of the connected first and second housings 44 and 46 and to attach an external label thereon. Protection tubes 34 are fixed to collimators 10a and 10b by sealing epoxy 38 with the brims of the protection tubes 34 connected to both brims of third housing 32, for protecting the ends of optical fibers 16 in collimators 10a and 10b. Thus, optical part 30 is completely packaged. Here, the thus-packaged optical part 30 shows an insertion loss deviation of 0.1 dB or lower with respect to temperature cycle.

With reference to FIGS. 3, 4, and 5, the conductive adhesive used in assembling the collimators and packaging the optical parts is ABLEBOND® 8380 (produced by Ablestik Laboratories of Germany) thermally hardened at 150° C. for one minute, at 125° C. for four minutes, and at 90° C. for ninety minutes, thereby remarkably improving characteristics of the collimators and optical parts in tensile strength, vibration, and temperature cycle. In addition, the conductive adhesive contains silver, thus showing an excellent electrical conductivity, and further a good heat conductivity. Therefore, a heat transfer rate is kept uniform between contact surfaces of optical devices, and the temperature cycle characteristics of the optical part can be improved. Especially, the volume of the conductive adhesive is reduced by 1% or less, as compared to a 4% volume decrease of the conventional fixing material, during curing. As for tensile strength, the conventional fixing material is 4–8 kgf, whereas the conductive adhesive of the present invention is 8–14 kgf, indicating the ABLEBOND® 8380 conductive adhesive is advantageous over the conventional fixing material with regard to tensile strength.

Figure 6:
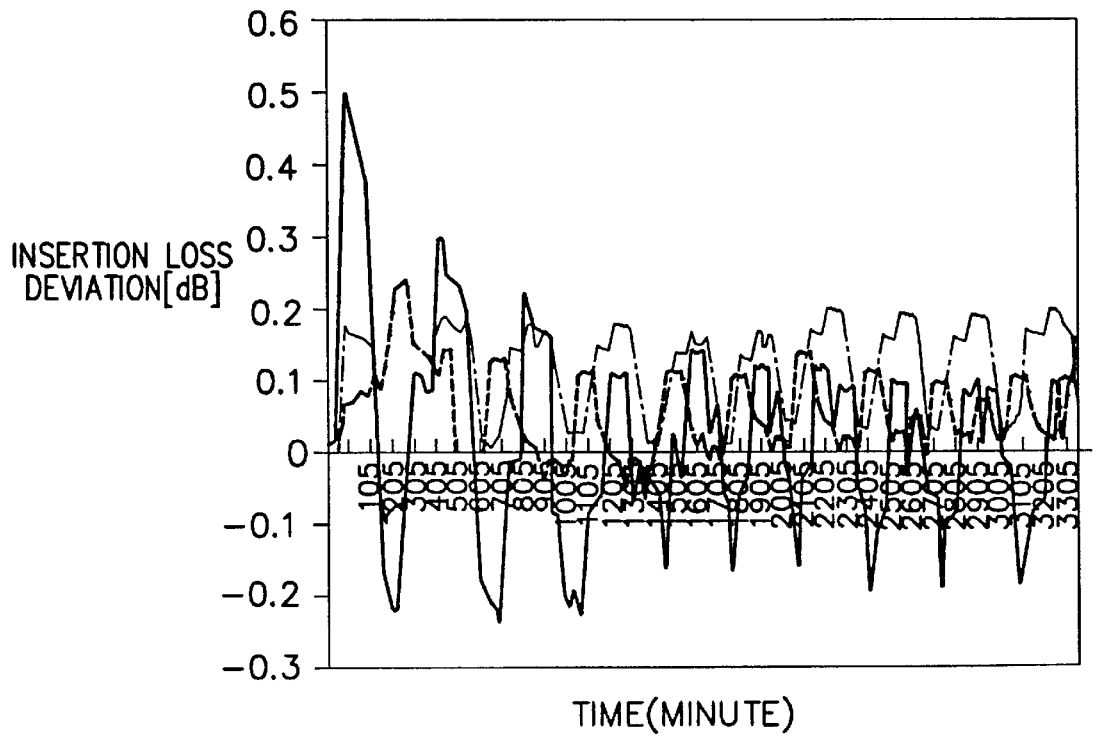
FIG. 6 is a graph of temperature cycle characteristics of the optical parts packaged according to the embodiments of the present invention and the conventional technology.

FIG. 6 is a graphic comparison of results of a temperature cycle test of optical parts packaged by the conventional fixing material and the conductive adhesive of the present invention. As shown in FIG. 6, the optical part packaged by the conventional fixing material experiences a rapid temperature loss variation in a temperature cycle of −20–60° C. because the fixing material is seriously expanded and contracted at a glass transition point Tg in an early temperature stage of the test. That is, assuming that a stable temperature cycle characteristic range is ±0.2 dB, the conventional packaged optical part fails to satisfy a specification for the first three cycles. With the glass transition temperature point Tg given as 90° C., the thermal expansion rate of the conductive adhesive of the present invention is larger than that of the fixing material at or above 90° C., and vice versa below 90° C. From the results, it is noted that the temperature cycle characteristics of the conductive adhesive is excellent when the operational temperature range of the optical parts is between −20–60° C. In addition, temperature cycle characteristics depending on the presence (1st and 2nd packaging) and absence (only 1st packaging) of housing 32 are shown in FIG. 6. The graph shows an insertion loss deviation of 0.05–0.1 dB depending on the presence and absence of housing 32.

Figure 7:
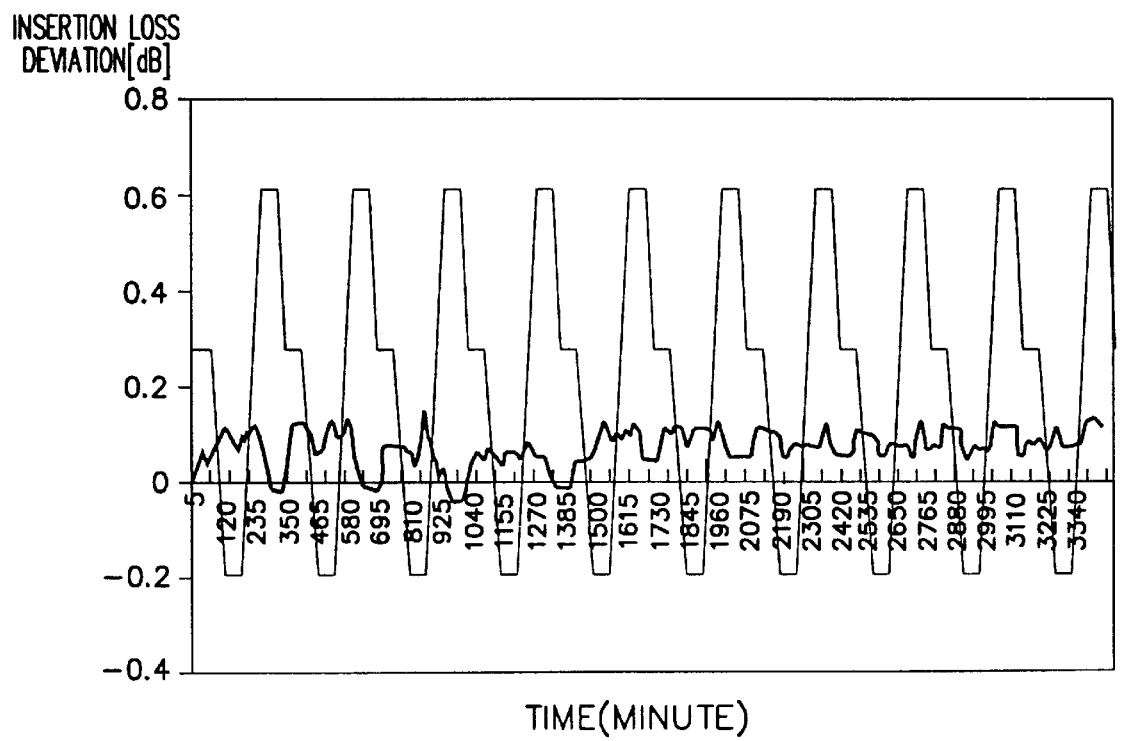
FIG. 7 is a graph of temperature cycle characteristics of a collimator fixed by a conductive adhesive according to the embodiments of the present invention.

FIG. 7 is a graph of temperature cycle characteristics of a collimator assembled by the conductive adhesive of the present invention. As shown in FIG. 7, the collimator experiences an insertion loss deviation of 0.07 dB for the first one and two cycles, and a 0.05 dB or smaller insertion loss deviation for the other cycles. The collimator assembled by the conductive adhesive is better than that assembled by the conventional fixing material with respect to the temperature cycle characteristics.

As described above, the optical part packaging method and the collimator assembling method of the present invention increase the adhesiveness of an adhesive by coating an optical fiber with a metal optical fiber tube, and improve temperature cycle characteristics and tensile strength of an optical part by assembling a collimator and packaging the optical part by use of a conductive adhesive. Further, fixing the first housing to the second housing by a waterproof and vibroisolating material improves the vibration characteristics of the optical part, prevents introduction of moisture into the optical part, and enables the optical part to operate at −40–80° C. The optical part can be automatically fabricated by reducing the number of solder joints in packaging the optical part, and the conductive adhesive can be applied to every optical part such as a fine optical part for connecting optical fibers, and a waveguide part requiring reliability.

What is claimed is:

1. A method for packaging and assembling a collimator having a ferrule for supporting an optical fiber, a lens for focusing light emitted from the optical fiber, and a sleeve for aligning the ferrule with the lens, said method comprising the steps of:

fixing an optical fiber tube and at least one optical fiber in alignment with a central axis of said ferrule by application of a conductive adhesive;

fixing said ferrule having said optical fiber fixed therein in said sleeve by application of said conductive adhesive; and fixing said lens in said sleeve by application of said conductive adhesive.

2. The method as set forth in claim 1, wherein said conductive adhesive is formed of one of thermal and electrical conductive materials which are contracted by 1% in volume after hardening, and have a tensile strength of about 8–14kgf.

3. The method as set forth in claim 1, wherein the optical fiber tube is formed of a metal.

4. The method as set forth in claim 1, further comprising the steps of:

fixing a first housing, integrally formed, around aligned first and second collimators by soldering to protect the optical components fixed in said first and second collimators;

fixing a second housing around said first housing by utilizing a waterproof and vibroisolating material to increase s mechanical strength of said first housing; and fixing protection tubes, respectively, to said first and second collimators by utilizing a sealing epoxy to protect the ends of said optical fibers in said first and second collimators.

5. The method as set forth in claim 4, wherein the waterproof and vibroisolating material is one of silicon and rubber adhesives.

6. A method for packaging an optical part having collimators which convert light emitted from a fine light source to a parallel light, and focus the parallel light, said method comprising the steps of:

fixing optical devices in first and second collimators by utilizing a conductive adhesive to increase temperature reliability and tensile strength of said optical devices and said collimators;

optically aligning said first and second collimators;

fixing a first housing, integrally formed, around said first and second collimators by soldering to protect the optical devices and fix the first and second collimators;

fixing a second housing around said first housing by utilizing a waterproof and vibroisolating material to increase a mechanical strength of said first housing; and fixing first and second protection tubes to said first and second collimators, respectively, by utilizing a sealing epoxy to protect said optical devices in said first and second collimators.

7. The method as set forth in claim 6, wherein said conductive adhesive is formed of one of thermal and electrical conductive materials.

8. The method as set forth in claim 6, wherein said first housing is fixed to said collimators by soldering at left, right, and center portions of each collimator to said first housing.

9. The method as set forth in claim 8, wherein said left and right portions of said collimators are soldered to said first housing at about 170–190° C., and said center portions are soldered to said first housing at about 120–150° C.

10. The method as set forth in claim 6, wherein said waterproof and vibroisolating material is one of silicon and rubber adhesives which are highly waterproofing and vibroisolating.

11. The method as set forth in claim 6, wherein said optical part has an insertion loss deviation of no more than 0.1 dB with respect to a predetermined temperature cycle.

12. A method for packaging an optical part having collimators which convert light emitted from a fine light source to a parallel light, and focus the transmitted parallel light, said method comprising the steps of:

bonding optical devices in first and second collimators by utilizing a conductive adhesive to increase temperature reliability and tensile strength of said optical devices and said collimators;

bonding a first housing around said first collimator and a second housing around said second collimator by soldering to protect the optical devices and bond the first and second collimators in said first and second housings, respectively;

optically aligning said first and second collimators bonded in said first and second housings;

bonding facing ends of said first and second housings to each other by soldering;

bonding a third housing around the bonded first and second housings by a waterproof and vibroisolating material to increase the mechanical strength of the bonded first and second housings; and bonding first and second protection tubes to said first and second collimators by utilizing a sealing epoxy to protect said optical devices in said first and second collimators, wherein brims of said first and second protection tubes are connected to corresponding brims of said third housing.

13. The method as set forth in claim 12, wherein said first and second housings are soldered to each other by a non-contact light source.

14. The method as set forth in claim 13, wherein said non-contact light source is one of a high-power laser diode and a xenon lamp.

15. The method as set forth in claim 12, wherein said conductive adhesive is formed of one of thermal and electrical conductive materials.

16. The method as set forth in claim 10, wherein the optical part has an insertion loss deviation of 0.1 dB or smaller with respect to a predetermined temperature cycle.

17. The method as set forth in claim 1, wherein said conductive adhesive is formed of ABLEBONDS® 8380.

18. The method as set forth in claim 6, wherein said conductive adhesive is formed of ABLEBOND® 8380.

19. The method as set forth in claim 12, wherein said conductive adhesive is formed of ABLEBOND® 8380.

* * * * *